United States Patent
Rogers et al.

[15] 3,658,558
[45] Apr. 25, 1972

[54] PREPARATION OF WHOLE EGG MAGMA PRODUCT

[72] Inventors: Alan B. Rogers, Palos Park; Michael Sebring, Westmont; Ralph W. Kline, Glen Ellyn, all of Ill.

[73] Assignee: Armour and Company, Chicago, Ill.

[ * ] Notice: The portion of the term of this patent subsequent to Oct. 7, 1986, has been disclaimed.

[22] Filed: May 27, 1969

[21] Appl. No.: 828,349

Related U.S. Application Data

[63] Continuation-in-part of Ser. No. 566,240, July 19, 1966, Pat. No. 3,471,302.

[52] U.S. Cl. ................................................99/161, 99/215
[51] Int. Cl. .....................................A23b 5/00, B65b 55/00
[58] Field of Search ............................99/161, 113, 212, 213

[56] References Cited

UNITED STATES PATENTS

| | | | |
|---|---|---|---|
| 2,053,740 | 9/1936 | Reichert et al. | 99/213 |
| 2,125,398 | 8/1938 | Reichert et al. | 99/213 |
| 2,776,214 | 1/1957 | Lloyd et al. | 99/161 |
| 3,364,037 | 1/1968 | Mink et al. | 99/161 |

*Primary Examiner*—Norman Yudkoff
*Assistant Examiner*—Hiram H. Bernstein
*Attorney*—Carl C. Batz and Frank T. Barber

[57] ABSTRACT

Whole egg magma is treated to free it of viable Salmonella organisms by heating the magma in the temperature range of about 130°–150° F. (preferably 134°–136° F.) in the presence of about 0.025–0.15 weight percent of hydrogen peroxide for at least 10 seconds to pasteurize the egg magma.

1 Claims, No Drawings

PREPARATION OF WHOLE EGG MAGMA PRODUCT

This application is a continuation-in-part of application Ser. No. 566,240, filed July 19, 1966, now U.S. Pat. No. 3,471,302 by Alan B. Rogers, Michael Sebring and Ralph W. Kline, entitled "Preparation of Whole Egg Magma Product."

This invention relates to the preparation of a whole egg magma product, and more particularly to a pasteurized whole egg magma free of viable Salmonella organisms and useful in the preparation of baked products of high volume.

Under present general practice, whole eggs are pasteurized by heat alone at temperatures of 140°–142° F. and above for a period of about 3½ minutes to destroy Salmonella and other pathogenic organisms. In such operations, there are fluctuations in temperature and time conditions, but while such conditions are effective in destroying organisms, it is found that the treatment also results in the loss of important emulsifying characteristics found particularly in the yolk material. The yolk material has a very beneficial effect in emulsifying fat during the preparation of products such as cream puffs, eclairs, unleavened sponge cakes, and the like, and when the emulsifying characteristics are impaired the baked products are greatly reduced in size, sometimes as much as tenfold. While artificial emulsifiers, such as lecithin, shortenings, etc., can be added to restore such products partly to their desired size, this represents an expensive procedure and the baked product remains an inferior product.

If hydrogen peroxide is employed as an aid to heat in order to pasteurize whole egg, the problem is further complicated because the egg white portion, which forms the major part of the whole egg, exhibits a high degree of catalase activity which causes a rapid breakdown of hydrogen peroxide into oxygen and water when hydrogen peroxide is added. Consequently, it has been believed necessary to inactivate the catalase activity by a preheating step prior to the use of the hydrogen peroxide.

We have discovered that it is possible to destroy the Salmonella organisms and to pasteurize the whole egg magma while retaining the full emulsifying properties of the yolk material by employing a temperature range of 130°–150° F. and while utilizing hydrogen peroxide in a very small proportion. It was surprising to find that under these conditions, it was unnecessary to inactivate the indigenous catalase, and the preheating step could be dispensed with. The pasteurized egg product is effective in producing baked products of large volume, including cream puffs, eclairs, unleavened sponge cake, and the like, while at the same time it is free of viable Salmonella organisms.

A primary object, therefore, of the invention is to provide a process for the preparation of whole egg magma free of viable Salmonella organisms and retaining the emulsifying properties of the egg yolk. A further object is to prepare a whole egg product which is effective in producing baked products of large volume and which retains the full emulsifying properties of the egg yolk. Other specific objects and advantages will appear as the specification proceeds.

Stated generally, our invention comprises the steps of intimately mixing whole egg magma with about 0.025–0.15 weight percent of hydrogen peroxide and maintaining said mixture within the temperature range of about 130°–150° F. for at least 10 seconds to pasteurize said magma without destruction of its functional properties.

In the preferred embodiment of our invention, whole eggs are brought to a temperature in the range of about 130° to about 139° F. in the presence of hydrogen peroxide in the range of about 0.025–0.15 weight percent for at least 2 minutes. However, a time-temperature effect is involved in the process, and we have found that temperatures above 139° F. may be used to produce equivalent results, provided the heating period is reduced to avoid destruction of functional properties. For example, we have found that heating whole eggs in the presence of 0.05 weight percent hydrogen peroxide at a temperature of 142° F. for 30 seconds will effectively destroy Salmonella organisms while at the same time maintaining the functional properties of the eggs. The same is true of heating at 145° F. for 20 seconds and at 150° F. for 10 seconds.

Temperatures of about 150° F. appear to be the practical upper limit using conventional pasteurization equipment which is presently in commercial use, since the plates and tubes of such equipment tend to become coated with coagulated egg product at the higher temperatures. If new pasteurization equipment is devised in which the buildup of product on the heating surfaces can be avoided, it is contemplated that even higher temperatures could be used to produce results equivalent to those disclosed herein. However, it appears that in such case the upper practical temperature limit would be in the neighborhood of 160° F. since at that temperature there is almost instantaneous destruction of the functional properties of whole eggs.

As a specific illustration of the process, excellent results have been obtained by holding the magma, in the presence of at least 0.05 weight percent of hydrogen peroxide, at a temperature of about 135° F. for a period of about 3½ minutes. The hydrogen peroxide is intimately mixed with the egg magma so as to contact every portion of the magma, and the above temperature is maintained for the necessary time to bring about pasteurization of the egg magma. When the egg magma is pasteurized, it is found that the Salmonella organisms have been destroyed. The pasteurization may be carried out in the usual heat exchange plates followed by the tube apparatus employed for continuous flow pasteurization of liquid food products, the hydrogen peroxide being injected into the stream of magma and the hydrogen peroxide and magma then proceeding under turbulent flow so as to bring about an intimate admixture of the peroxide and magma.

In the foregoing process, the hydrogen peroxide may vary from about 0.025 to 0.15 weight percent. In the temperature range described above, we find that an extremely small amount of hydrogen peroxide will suffice, and where the temperature is maintained for about 3½ minutes we prefer to employ about 0.05 weight percent of hydrogen peroxide. Best results have been obtained from the standpoint of retaining the full emulsifying properties of the lipo-protein fraction of the yolk while destroying the viable Salmonella organisms, by employing a temperature of about 134°–136° F. (preferably 135° F.).

Why under the above conditions it is unnecessary to employ a preheating step to inactivate catalase activity, we are unable to explain. The presence of the yolk may have some influence, and the temperature range shown may also have some bearing on the matter. It was a surprise to find that the entire process could be carried out through the simple steps of holding the magma at 130°–150° F. in the presence of hydrogen peroxide and without pretreating the egg magma in any manner.

Specific examples illustrative of the process may be set out as follows:

EXAMPLE I

A series of tests were made in which whole eggs were heated for 3½ minutes at temperatures of 140° F. without hydrogen peroxide, and similar tests were made in which the magma was heated for the same length of time with hydrogen peroxide present and at a temperature of 135° F., the conditions and the results being set out in the following table in which "Before" indicates "before pasteurization" and "After" indicates "after pasteurization." The table shows the total amount of organisms and the coliform organisms present and the numbers of Salmonella organisms added. The plus sign in the column entitled "After Pasteurization" indicates the presence of Salmonella, and the minus sign indicates the absence of Salmonella. The term "TNTC" means "too numerous to count." The term "LT" means "less than."

TABLE I

| Temperature, 3.5 min., °F. | Hydrogen peroxide, percent | Salmonella organisms | | Total plate count | | Coliform count | |
|---|---|---|---|---|---|---|---|
| | | Added numbers per/gram | After Pasteurization | Before | After | Before | After |
| 140 | 0 | $1.7 \times 10^6$ | + | $9.2 \times 10^5$ | $3.4 \times 10^2$ | $1.6 \times 10^4$ | [1] 10 |
| 140 | 0 | $4.4 \times 10^6$ | + | $17.0 \times 10^5$ | $10.0 \times 10^2$ | $6.6 \times 10^4$ | $4.4 \times 10^2$ |
| 140 | 0 | $6.2 \times 10^6$ | + | $26.0 \times 10^5$ | $26.0 \times 10^2$ | [2] | $1.3 \times 10^2$ |
| 135 | .1 | $1.7 \times 10^6$ | – | $9.7 \times 10^5$ | $0.7 \times 10^2$ | $15.0 \times 10^4$ | [1] 10 |
| 135 | .1 | $4.4 \times 10^6$ | – | $10.0 \times 10^5$ | $1.2 \times 10^2$ | $9.5 \times 10^4$ | [1] 10 |
| 135 | .1 | $6.2 \times 10^6$ | – | $100.0 \times 10^5$ | [1] 10 | [2] | [1] 10 |
| 135 | 0.05 | $4.7 \times 10^6$ | – | $2.9 \times 10^5$ | $22.0 \times 10^2$ | $3.2 \times 10^4$ | [1] 10 |
| 135 | 0.05 | $4.7 \times 10^6$ | – | $2.6 \times 10^5$ | $4.0 \times 10^2$ | $3.1 \times 10^4$ | [1] 10 |
| 135 | 0.05 | $4.7 \times 10^6$ | – | $4.4 \times 10^5$ | $1.0 \times 10^2$ | $2.8 \times 10^4$ | [1] 10 |
| 135 | 0.05 | $4.7 \times 10^6$ | – | $2.3 \times 10^5$ | $1.0 \times 10^2$ | $1.1 \times 10^4$ | [1] 10 |

[1] LT (less than).
[2] TNTC (too numerous to count).

EXAMPLE II

Tests were made to determine the functional difference between raw unpasteurized whole eggs, whole eggs pasteurized at 140° F. for 3½ minutes, and whole eggs pasteurized at 135° F. for 3½ minutes in the presence of 0.1 percent hydrogen peroxide. The results were obtained in the baking of cream puffs and are set out in the following table:

TABLE II

| Product Description | Cream-Puff Volume in CC/Gram |
|---|---|
| Raw unpasteurized | 11.58 |
| 135° F. for 3.5 min. 0.1% $H_2O_2$ | 10.22 |
| Commercial pasteurized 140° F. 3.5 min. Lot I | 6.80 |
| Commercial pasteurized 140° F. 3.5 min. Lot II | 6.34 |

Cream-Puff Formula

In the preparation of the cream puffs, the following procedure was used: 1 Lb. 4 oz. of water, 1 lb. 4 oz. of non-emulsified shortening and ½ oz. of salt were combined and brought to a temperature of 210° F. 1 Lb. of bread flour was added, stirred into the mix, and the temperature brought back to 190° F. The mixture was then cooled to 160° F. While mixing, 2 lbs. of whole egg was added slowly. As soon as the egg was incorporated, 3.5 grams of ammonium carbonate and 4 oz. of liquid milk were added. The batter was then bagged out and baked at 425° F. for 30 minutes.

EXAMPLE III

The effect of pasteurization conditions on cream-puff shell volume and particularly the temperatures employed in pasteurization are shown in the following table:

TABLE III

| Pasteurization Temperature | Volume in CC/Gram |
|---|---|
| 136° F. for 3½ min. | 10.83 |
| 143.5° F. for 3½ min. | 6.4 |
| 145° F. for 3½ min. | 2.4 |
| 147° F. for 3½ min. | 2.3 |
| Control unpasteurized whole egg | 11.58 |

EXAMPLE IV

The effect of treatment on cream-puff shell volume and destruction of Salmonella, particularly at higher temperatures and shorter times, using 0.05 percent by weight of hydrogen peroxide is shown in the following table:

TABLE IV

| Temperature | Time | Cream-Puff Shell Vol. CC/Gram | Salmonella Organisms |
|---|---|---|---|
| 145° F. | 15 sec. | 10.7 | – |
| | 30 sec. | 8.8 | – |
| | 45 sec. | 7.4 | – |
| | 60 sec. | 7.0 | – |
| | 120 sec. | 6.3 | – |
| 150° F. | 15 sec. | 8.6 | – |
| | 30 sec. | 7.4 | – |
| | 45 sec. | 5.2 | – |

EXAMPLE V

Whole eggs were mixed with 0.05 weight percent of hydrogen peroxide, and the temperature was raised quickly to 150° F. The mixture was then immediately chilled. Cream-puff baking tests and bacteriological tests for the presence of Salmonella were carried out. The results were as follows:

TABLE V

| | Cream-Puff Shell Vol. CC/Gram | Salmonella Organisms |
|---|---|---|
| Whole eggs with 0.05% $H_2O_2$ | 8.9 | – |

While in the foregoing specification we have set out embodiments of the invention in considerable detail for the purpose of illustrating the invention, it will be understood that such details may be varied widely by those skilled in the art without departing from the spirit of our invention.

We claim:

1. In a method for preparing a pasteurized whole egg magma free of viable Salmonella organisms, the steps of intimately mixing said magma with about 0.025 to 0.15 weight percent of hydrogen peroxide and maintaining said mixture within the temperature range of about 130° to 150° F. for at least 10 seconds to pasteurize said magma without substantial destruction of its emulsifying properties.

* * * * *